No. 674,637. Patented May 21, 1901.
O. D. REEVES.
SASH HOLDER AND FASTENER.
(Application filed Sept. 6, 1900.)

(No Model.)

WITNESSES:
Wm E Thompson
Sara Alexander

INVENTOR:
Orange D. Reeves.
BY
E. T. Silvius,
ATTORNEY.

UNITED STATES PATENT OFFICE.

ORANGE D. REEVES, OF INDIANAPOLIS, INDIANA, ASSIGNOR OF ONE-HALF TO JOHN O. SLOAN, OF SAME PLACE.

SASH HOLDER AND FASTENER.

SPECIFICATION forming part of Letters Patent No. 674,637, dated May 21, 1901.

Application filed September 6, 1900. Serial No. 29,171. (No model.)

*To all whom it may concern:*

Be it known that I, ORANGE D. REEVES, a citizen of the United States, residing at Indianapolis, in the county of Marion and State of Indiana, have invented certain new and useful Improvements in Sash Holders and Fasteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a device that is designed to be secured to a window-casing, so as to operate against a sash mounted therein, the object of the invention being to provide a cheap and reliable article of this character adapted more particularly for application in hospitals for the insane and in situations where there may be children of irresponsible age.

The invention consists in an improved form of temporary holder for retaining an unbalanced sash while being more permanently fastened and in improvements in the fastening or locking devices; and it consists also in the parts and combination and arrangement of parts hereinafter particularly described and claimed.

Figure 1:
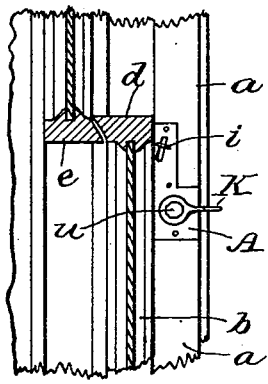
Figure 2:
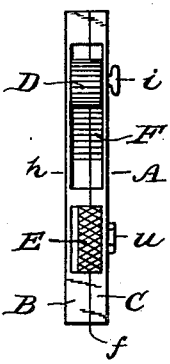
Figure 3:
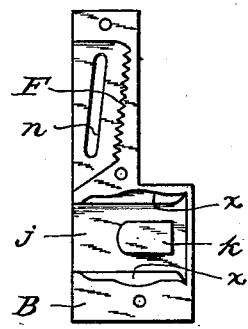
Figure 4:
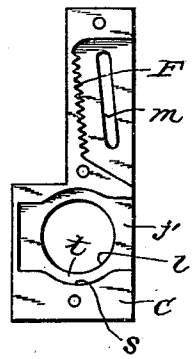
Figure 5:
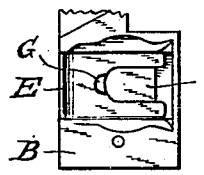
Figure 6:
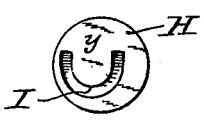
Figures 7, 8:
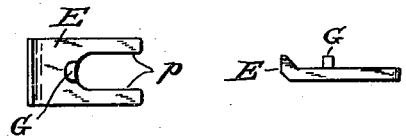
Figure 9:
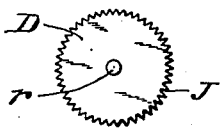
Figure 10:
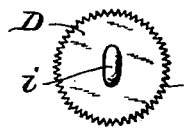
Figure 11:
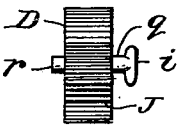
Figure 15:
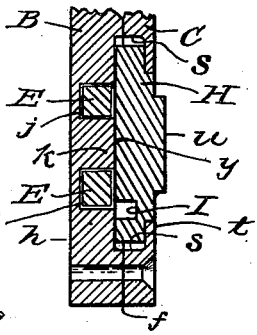
Figure 12:
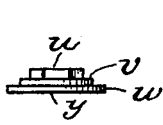
Figures 13, 14:
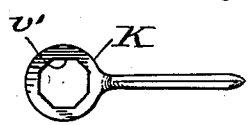

Referring to the drawings, Figure 1 represents a fragmentary sectional elevation of a window frame and sashes to which my invention is applied; Fig. 2, an elevation of the complete invention, showing the side which should be disposed toward the sash; Fig. 3, an inside plan view of the case-body; Fig. 4, an inside plan view of the case-cap; Fig. 5, a fragmentary plan view of a portion of the case-body, showing the locking-bolt therein; Fig. 6, a bottom plan view of the locking-bolt controller; Fig. 7, a top plan view of the locking-bolt; Fig. 8, a side elevation of the locking-bolt; Figs. 9, 10, and 11, views in elevation of the sash-holding roller; Fig. 12, a top plan view of the locking-bolt controller, and Fig. 13 an elevation view of the same; Fig. 14, a top plan view of the operating-wrench, and Fig. 15 a sectional view showing portions of the locking-bolt and the controller in the case. Figs. 9, 10, 11, and 15 are exaggerated views.

Similar reference characters in the several figures of the drawings designate similar parts.

In the drawings, A designates the holder and fastener in its entirety; $a$, the strip that is fitted to the window-frame at the front of the sash; $b$, the lower sash, of which $d$ is the top rail; $e$, the lower rail of the upper sash, and $h$ indicates the base side of the device, which should be placed next to the window-casing.

In construction I provide a case for supporting the several parts, preferably of non-corrosive metal, comprising a body B and a cap C, both, however, as shown, performing together the functions of a body, the separating-line $f$ of the two being nearly central or may be exactly so; but in some cases the parting-line may be nearer the surface, so that the cap would be of less thickness. The two parts may be suitably secured together detachably. The upper portion of the case has a cavity, at the bottom of which are a series of teeth F, arranged in a plane at an angle oblique to the side of the case that is to oppose the sash. At the sides of the cavity are registering slots $m$ and $n$, formed in the walls of the case in lines parallel to the line of the bottom of the cavity. A roller D, having journals $q\ r$, is mounted in the cavity, the axles being in the slots. The periphery of the roller has teeth J engaging the teeth F, so that the roller may be easily controlled by rotating the same, a knob $i$ being formed at the extremity of the axle-journal $q$ to be used as a lever in operation. The oblique angles of the bottom of the cavity and the slots are so disposed that as the roller descends it emerges partially from the cavity to engage the sash. The lower part of the case, which preferably has a greater breadth than the upper portion thereof, has a cavity $j$, the bottom and sides of which form slideways and support a locking-bolt E, arranged to slide horizontally and protrude from the cavity toward the sash to engage the same, the engaging end of the bolt being milled or roughened. In the cavity $j$ is a post $k$, equal in height to the faces $x\ x$ of the body B, and upon these faces and the face of the post the under face $y$ of the controller H works, at the same time providing a cover and guide-face for the locking-bolt, the latter having an opening $p$ to clear the post $k$. At the front face of the bolt E, adjacent the opening $p$, is a projecting stud G, that projects into an eccentrically-formed channel I in the under face $y$ of the controller H, the body $w$ of which is circular, the face $y$ being a plane surface except for the channel therein. The outer portion $v$ of the body is also circular, but slightly smaller in diameter than the body $w$, and upon the outer face is a projecting central portion, octagonal in plan, forming a key-post $u$ to be engaged by a lever wrench or key K, having an opening $v'$, corresponding to the post. The octagonal form is so designed because it is so nearly circular that it cannot readily be manipulated without a proper wrench or key.

The cap C has a circular opening $l$, in a recess $j'$ in which the circular portion $v$ is rotatively fitted, the post $u$ projecting through and the larger body portion $w$ working against the lip $t$, which retains the controller H, the cap having a recess $s$ to clear the portion $w$.

In operation the device should be attached somewhat in the position shown in Fig. 1 relatively to the lower sash, the strip $a$ being cut away to let in the case of the holder and fastener A. As the sash may have no balance-weights or one sash-cord may be broken, thus leaving the sash unbalanced, the holder-roller D will operate automatically to prevent accidental descent of the sash at all points until the fastener or locking-bolt may be operated, which may be done by means of the wrench K applied to the post $u$, the foregoing description rendering the mode of operation plain.

Having thus described my invention, what I claim as new, and desire to secure by Letters Patent, is—

In a sash holder and controller, the combination of the case having the cavity therein, the post in said cavity, the cap having the aperture registering with said post, the locking-bolt in said cavity, the stud on said bolt, the controller mounted in said aperture and bearing on said post and having the channel engaging said stud, and the key engaging said controller, substantially as set forth.

In testimony whereof I affix my signature in presence of two witnesses.

ORANGE D. REEVES.

Witnesses:
E. T. SILVIUS,
SARA ALEXANDER.